US009147081B2

(12) United States Patent
Satran

(10) Patent No.: US 9,147,081 B2
(45) Date of Patent: Sep. 29, 2015

(54) METHOD OF ACCESS CONTROL TO STORED INFORMATION AND SYSTEM THEREOF

(75) Inventor: Julian Satran, Haifa (IL)

(73) Assignee: INFINIDAT LTD., Herzliya (IL)

(*) Notice: Subject to any disclaimer, the term of this patent is extended or adjusted under 35 U.S.C. 154(b) by 1099 days.

(21) Appl. No.: 13/190,919

(22) Filed: Jul. 26, 2011

(65) Prior Publication Data

US 2012/0030426 A1 Feb. 2, 2012

Related U.S. Application Data

(60) Provisional application No. 61/367,966, filed on Jul. 27, 2010.

(51) Int. Cl.
G06F 21/62 (2013.01)
(52) U.S. Cl.
CPC .................................. *G06F 21/6218* (2013.01)
(58) Field of Classification Search
CPC .................................................. G06F 21/6218
See application file for complete search history.

(56) References Cited

U.S. PATENT DOCUMENTS

| 5,860,137 | A | 1/1999 | Raz et al. |
| 7,051,147 | B2 | 5/2006 | Hoese et al. |
| 7,130,900 | B2 | 10/2006 | Shiga et al. |
| 7,315,914 | B1 | 1/2008 | Venkatanarayanan et al. |
| 7,350,022 | B2 | 3/2008 | Mizuno et al. |
| 7,353,542 | B2 | 4/2008 | Shiga et al. |
| 7,523,201 | B2 | 4/2009 | Lee et al. |
| 7,763,455 | B2 | 7/2010 | Cima et al. |
| 2008/0022120 | A1* | 1/2008 | Factor et al. ............ 713/184 |

OTHER PUBLICATIONS

"The Keyed-Hash Message Authentication Code (HMAC)", Federal Information Processing Standards Publication, National Institute of Standards and Technology NIST, Jul. 2008, http://csrc.nist.gov/publications/fips/fips198-1/FIPS-198-1__final.pdf.*

* cited by examiner

*Primary Examiner* — Michael Alsip
(74) *Attorney, Agent, or Firm* — Reches Patents

(57) ABSTRACT

The presently disclosed subject relates at least to a method and system for controlling access to a logical unit (LU) in a logical storage space, available to a given initiator, representing a corresponding physical storage space, said logical storage space being accessible via a storage control layer, said storage control layer being associated with a security manager. A first value is generated by the security manager, based on a secret key, and transmitted to host requesting permission to access the logical storage space, while the secret key is made available to a target associated with the logical storage space. The host sends to the control device an access related request, the request comprising a second value which was generated based on the first value. Responsive to the command the target calculates the first value, based on the secret key and the second value based on the first value. The second value is validated with the help of said secret key and the respective access is allowed in case the second value is validated.

31 Claims, 9 Drawing Sheets

Fig. 2

Prior art

| Bit Byte | 7 | 6 | 5 | 4 | 3 | 2 | 1 | 0 |
|---|---|---|---|---|---|---|---|---|
| 0 | | | | FCP_LUN | | | | |
| 7 | | | | | | | | |
| 8 | | | | Command reference number | | | | |
| 9 | | | Task attribute | | | | | |
| 10 | Reserved | | | | | Task management flags | | |
| 11 | Additional fcp_cdb length = (n-27)/4 | | | | | | rddata | wrdata |
| 12 | | | | FCP_CDB | | | | |
| 27 | | | | | | | | |
| 28 | | | | Additional FCP_CDB | | | | |
| N | | | | | | | | |
| N+1 | | | | FCP_DL | | | | |
| N+2 | | | | | | | | |
| N+3 | | | | | | | | |
| N+4 | | | | | | | | |

METHOD OF ACCESS CONTROL TO STORED INFORMATION AND SYSTEM THEREOF

CROSS-REFERENCES TO RELATED APPLICATIONS

This application relates to and claims priority from U.S. Provisional Patent Application No. 61/367,966 filed on Jul. 27, 2010 incorporated herein by reference in its entirety.

FIELD OF THE PRESENTLY DISCLOSED SUBJECT MATTER

The present invention relates, in general, to data storage networks and methods of operating thereof, and, more particularly, to methods and systems of access control in the storage networks.

BACKGROUND OF THE PRESENTLY DISCLOSED SUBJECT MATTER

Storage systems organize data in terms of logical volumes that are presented to external hosts as logical units within a logical storage space. Logical units are identified by a logical unit number (LUNs). While a storage system can be connected to many hosts, it is often desirable to restrict the access of hosts to the logical storage space according to different criterions, such as specific LUNs.

Indeed, the problems of access control to storage resources have been recognized in the past and various systems and methods have been developed to provide a solution. References considered to be relevant as background to the presently disclosed subject matter are listed below. Acknowledgement of the references herein is not to be inferred as meaning that these are in any way relevant to the patentability of the presently disclosed subject matter.

U.S. Pat. No. 5,860,137 (Raz et al.) discloses a method of operating a data storage system that includes a plurality of host connections for connecting host processors to the data storage system. The data storage system includes digital storage that is partitioned into a plurality of volumes. The method includes the steps of mapping the plurality of volumes to the plurality of host connections so that each of the host connections has associated therewith a corresponding subset of the volumes and wherein a host processor connected to any given one of the host connections is able to access only the volumes that are mapped to that host connection. In the data storage system, supporting connect and disconnect commands. The connect command enables a host processor to map a designated one of the volumes to a designated one of the host connections; and the disconnect command enables a host processor to unmap a designated one of the volumes from a designated one of the host connections.

U.S. Pat. No. 7,051,147 (Hoese et al.) discloses a storage router and storage network providing virtual local storage on remote storage devices to Fiber Channel devices. A plurality of Fiber Channel devices is connected to a Fiber Channel transport medium, and a plurality of storage devices is connected to a second Fiber Channel transport medium. The storage router interfaces between the Fiber Channel transport media. The storage router maps between the workstations and the storage devices and implements access controls for storage space on the storage devices. The storage router then allows access from the workstations to the storage devices using native low level, block protocol in accordance with the mapping and the access controls.

U.S. Pat. No. 7,130,900 (Shiga et al.) discloses storage management method in a computer system having a storage device, switches and hosts respectively connected by a network, in accordance with an ID of a logical volume of the storage device and an IP address of a host. Access control configuration of the logical volume is performed relative to the storage device, the IP address of the host is converted into a MAC address, the MAC address of the host is converted into a port ID of the switch connected to the host, and addition of the port to virtual local area network (VLAN) is performed for the switch. Logical unit number (LUN) masking and VLAN configuration essential for security countermeasure of IP-SAN (Internet protocol-storage area network) can be managed collectively by a system administrator so that the running cost of IP-SAN can be lowered.

U.S. Pat. No. 7,350,022 (Mizuno et al.) discloses a storage management method in a computer system which includes a storage device and a disk control device that controls data transfer between the storage device and a host computer. For purpose of enhancement a security of storage medium making up the storage device, the storage system is provided with a password management table, that manages a password for the entire storage device, for each storage medium or for each logical device, and also with a function of setting and unlocking the password for the entire storage device, for each storage medium or for each logical device.

U.S. Pat. No. 7,353,542 (Shiga et al.) discloses a storage management method in a computer system in which one or more computers on which one or more initiators operate and a storage device on which one or more targets operate are connected with each other through a network. An authentication table for authenticating validity of a user of a computer is associated with an authorization table for authorizing access of an initiator to a certain target, to limit such accesses.

U.S. Pat. No. 7,523,201 (Lee et al.) discloses a system and method for optimizing LUN masking of a storage appliance. Upon login, an initiator data structure containing a LUN map is created and associated with each initiator connected to the storage system. When an initiator sends a message directed to a LUN associated with the storage system, the storage system maps the LUN sent by the initiator to a physical LUN associated with the storage system using the LUN map. If the LUN map contains an appropriate entry, then the LUN has been successfully exported and/or masked to the given initiator.

U.S. Pat. No. 7,763,455 (Hall) discloses a computer system having at least two processing nodes and a shared data storage system comprising a number of storage units. Each storage unit has a logical unit number (LUN). A first of the processing nodes stores a maximum LUN value in non-volatile storage, and is arranged to perform, on boot-up, a device discovery procedure in which it scans the shared data storage system to find storage units with LUNs not greater than the maximum LUN value. A second of the processing nodes stores a start LUN value in non-volatile storage, and is arranged to perform, on boot-up, a device discovery procedure in which it scans the shared data storage system to find storage units with LUNs not less than the start LUN value. This allows LUN masking to be achieved relatively inexpensively with only minimal modification to the operating systems of the processing nodes, using existing device discovery features of the operating system.

US Patent Application 2008022120 (Factor et al.) discloses a method for accessing a storage device, the method includes: receiving, by storage device, a block based storage access command and cryptographically secured access control information; wherein the block based storage access command and the cryptographically secured access control information are associated with at least one fixed size block of data and with a client; processing at least a portion of the cryptographically secured access control information by using a secret key accessible to the storage device and to a security entity; and selectively executing the block based storage access command in response to a result of the processing.

SUMMARY

According to a first aspect of the presently disclosed subject matter, there is provided a method of controlling access to at least one logical unit (LU) available to a given initiator in a logical storage space, the method comprising: responsive to an access-related request related to the given initiator and to a target being associated with the logical unit, generating a first value with the help of a secret key, wherein the secret key is available to the target and wherein the first value is generated externally to the target and the given initiator;

sending the first value to a host associated with the given initiator and in response, receiving by the target a second value, generated based on the first value; validating by the target the received second value with the help of the secret key; and allowing the respective access in case the second value is validated.

According to some embodiments of the invention the logical storage space is a logical representation of physical storage space which is accessible by a control layer, the control layer is associated with a security manager and wherein at least the generating a first value is performed by the security manager.

According to another aspect of the presently disclosed subject matter there is provided a method of operating a security manager configured to control access to at least one logical unit (LU) in a logical storage space, available to a given initiator, representing a corresponding physical storage space, the logical storage space being accessible via a storage control layer, the storage control layer being associated with a security manager, the method comprising: receiving, by the security manager, an access-related request related to the given initiator and to a target being associated with the logical unit; generating, by the security manager, a first value with the help of a secret key; the secret key being available to the target; sending the first value to a host associated with the initiator; and enabling the target, responsive to a second value received from the host, generated based on the first value, to validate the received second value with the help of the secret key; and allow the respective access in case the second value is validated.

According to a further aspect of the presently disclosed subject matter there is provided a storage system comprising a storage control layer, a physical storage space represented by logical storage space accessible via the storage control layer, and a security manager operatively associated with the control layer and configured to control access to at least one logical unit associated with a respective target associated with the logical storage space, the security manager is further configured to receive an access-related request related to a given initiator and to the target associated with the logical unit, to generate a first value with the help of a secret key, the secret key being available to the target and to send the first value to a host associated with the given initiator; the target is configured, responsive to a second value received from the host generated based on the first value, to validate the received second value with the help of the secret key; and allow the respective access in case the second value is validated.

According to a further aspect of the presently disclosed subject matter there is provided a security manager operatively connectable to a storage system comprising a storage control layer, a physical storage space represented by logical storage space accessible by the storage control layer, the security manager is configured to control access to at least one logical unit associated with a respective target associated with the logical storage space, the security manager is further configured to receive an access-related request related to a given initiator and to the target associated with the logical unit, to generate a first value with the help of a secret key, the secret key being available to the target and to send the first value to a host associated with the given initiator; and thereby enable the target, responsive to a second value received from the host generated based on the first value, to validate the received second value with the help of the secret key; and allow the respective access in case the second value is validated.

According to yet a further aspect of the presently disclosed subject matter there is provided a program storage device readable by machine, tangibly embodying a program of instructions executable by the machine to perform method steps of a method of controlling access to at least one logical unit (LU) available to a given initiator in a logical storage space, the method comprising: responsive to an access-related request related to the given initiator and to a target being associated with the logical unit, generating a first value with the help of a secret key, wherein the secret key is available to the target and wherein the first value is generated externally to the target and the given initiator; sending the first value to a host associated with the given initiator and in response, receiving by the target a second value, generated based on the first value; validating by the target the received second value with the help of the secret key; and allowing the respective access in case the second value is validated.

According to certain embodiments of the presently disclosed subject matter the methods, system, security manger and program storage device further include one or more of the following elements:

Operability to validate the access-related request, wherein the validation is provided externally to the target and the given initiator.

Operability to validate the second value by:

generating, by the target, the first value with the help of the secret key and generating a third value based on the first value;

comparing the received second value with the generated third value; and allowing the respective access in case the second value and the third value are the same.

Wherein the first value is calculated with the help of a respective first function and the second value is calculated with the help of a respective second function, and wherein the first function and second function are available to the target and are utilized by it to calculate the first and the third values, respectively.

Wherein the first value is generated with the help of an identifier of the logical unit, thereby enabling to selectively permit access to a logical unit identified by the identifier.

Wherein commands are classified according to command-groups, each command-group identified by a specific command-group identifier ($G_i$), and wherein the first value is generated with the help of a command-group identifier ($G_i$) corresponding to the command, thereby enabling to selectively permit to execute a command identified by the command-group identifier ($G_i$).

Operability to receive, by the target a SEED; the SEED is sent from the security manager to the target and the host substantially at the same time;

To receive, by the target, from the host, a first identifier associated with the initiator wherein the identifier is generated with the help of the SEED and according to predefined principles;

To generate, by the target, a second identifier with the help of the SEED, in accordance with the principles;

To compare the first identifier and the second identifier;

To allow respective access in case the first identifier and the second identifier are substantially the same.

Wherein communication between the target, and the initiator is in accordance with SCSI protocol.

Operability to receive, a secure-LUN field comprising the second value. The secure-LUN further comprises an identifier of the initiator generated with the help of a SEED in accordance with predefined principles.

Operability to receive, a delegated request from a delegated initiator, the delegated request comprising a delegated value generated by the initiator based on the second value and transmitted to the delegated initiator; validated the delegated value with the help of the secret key and a value corresponding to the second value; and allow the delegated request in case the delegated value is validated.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 2 is a schematic illustration of a SCSI Command Descriptor Block, as known in the art;

DETAILED DESCRIPTION OF THE PRESENTLY DISCLOSED SUBJECT MATTER

Figure 1:
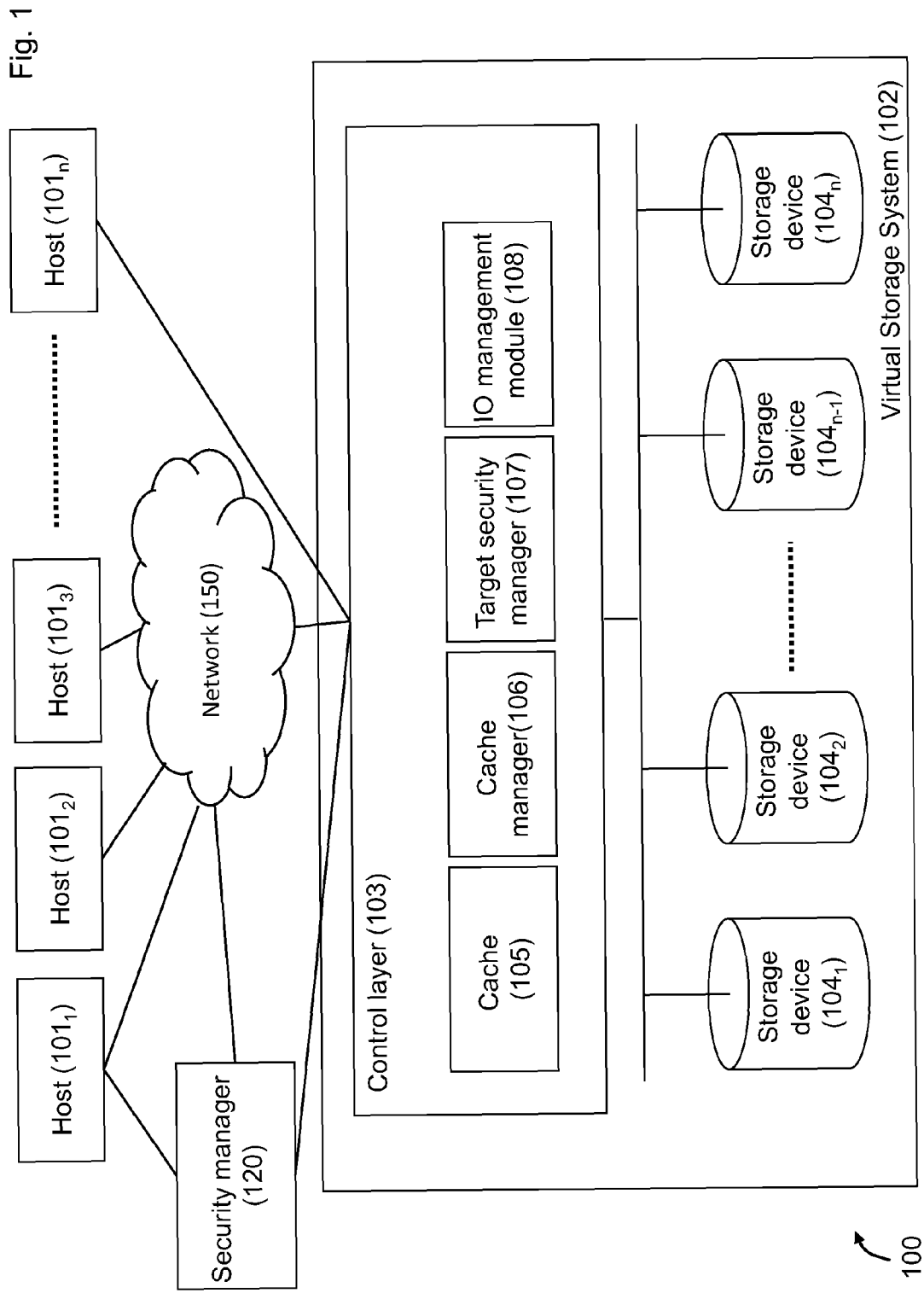
FIG. 1 illustrates a general schematic of the system architecture in accordance with the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "receiving", "sending", "calculating", "executing", "generating", "validating", "comparing, or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIG. 5a-5c and FIG. 8a-8c may be executed. In embodiments of the presently disclosed subject matter one or more stages illustrated in FIG. 5a-5c and FIG. 8a-8c may be executed in a different order and/or one or more groups of stages may be executed simultaneously. FIG. 1, FIG. 4, FIG. 6 and FIG. 7 illustrate a general schematic of the system architecture in accordance with an embodiment of the presently disclosed subject matter. Each module in FIG. 1, FIG. 4, FIG. 6 and FIG. 7 can be made up of any combination of software, hardware and/or firmware that performs the functions as defined and explained herein. The modules in FIG. 1, FIG. 4, FIG. 6 and FIG. 7 may be centralized in one location or dispersed over more than one location. In other embodiments of the presently disclosed subject matter, the system may comprise fewer, more, and/or different modules than those shown in FIG. 1, FIG. 4, FIG. 6 and FIG. 7.

It should be noted that the presently disclosed subject matter is not bound by the specific architecture in FIG. 1 and equivalent and/or modified functionality may be consolidated or divided in another manner and may be implemented in any appropriate combination of software, firmware and hardware. Those versed in the art will readily appreciate that the invention is, likewise, applicable to any computer system and any storage architecture implementing a virtualized storage system. According to the presently disclosed subject matter the functional blocks and/or parts thereof may be placed in a single or in multiple geographical locations (including duplication for high-availability) depending on the specific implementation; operative connections between the blocks and/or within the blocks may be implemented directly (e.g. via a bus) or indirectly, including remote connection. The remote connection may be provided via Wire-line, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.).

Bearing this in mind, attention is drawn to FIG. 1 illustrating a general schematic of the system architecture in accordance with an embodiment of the presently disclosed subject matter. System 100 comprises a plurality of host computers (workstations, application servers, etc.) illustrated as $101_{1-n}$ sharing common storage means provided by a virtualized storage system 102. The storage system comprises a storage control layer 103 comprising one or more appropriate storage control devices operatively coupled to the plurality of host computers $101_{1-n}$ and a plurality of data storage devices $104_{1-n}$ constituting a physical storage space optionally distributed over one or more storage nodes, wherein the storage control layer 103 is operable to control interface operations between hosts $101_{1-n}$ and data storage devices $104_{1-n}$. As used herein the term "interface operation" (or access-related operations) that include, input/output (I/O) operations and management and control operations (e.g. SCSI report LUNs command). Connection between hosts computers $101_{1-n}$ and virtual storage system 102 can be a direct connection. Alternatively or additionally the connection can be establish via a network 150.

The storage control layer 103 is further operable to handle a virtual representation of physical storage space and to facilitate necessary mapping between the physical storage space and its virtual representation (i.e. a logical storage space). Control layer 103 is configured to create and manage at least one virtualization layer interfacing between elements of the computer system (host computers, etc.) external to the storage system and the physical storage space.

The virtualization functions may be provided in hardware, software, firmware or any suitable combination thereof. Optionally, the functions of control layer 103 may be fully or partly integrated with one or more host computers and/or storage devices and/or with one or more communication devices enabling communication between the hosts and the storage devices. Optionally, a format of logical representation provided by control layer 103 may differ, depending on interfacing applications.

The physical storage space may comprise any appropriate permanent storage medium and may include, by way of non-limiting example, one or more disk units (DUs), also called "disk enclosures", comprising several disk drives (disks). The physical storage space comprises a plurality of data blocks, each data block may be characterized by a pair ($DD_{id}$, DBA) where $DD_{id}$ is a serial number associated with the disk drive accommodating the data block, and DBA is a logical block number within the respective disk. By way of non-limiting example, $DD_{id}$ may represent a serial number internally assigned to the disk drive by the system or, alternatively, a WWN or universal serial number assigned to the disk drive by a vendor or manufacturer. The storage control layer 103 and storage devices $104_{1-n}$ may communicate with host computers $101_{1-n}$ and within the storage system in accordance with any appropriate storage protocol.

Data stored in the physical storage space, may be logically represented to a client (host) in terms of logical objects within a logical storage space. Depending on the storage protocol, the logical objects may be logical volumes, data files, multimedia files, snapshots and other copies, etc.

A logical volume (LV) represents a plurality of data blocks characterized by successive Logical Block Addresses (LBA) ranging from 0 to a number LUK. Different logical volumes may comprise different numbers of data blocks, while the data blocks are typically of equal size within a given system (e.g. 512 bytes). The entire address space of the storage system is divided into logical volumes, and each logical volume becomes an addressable device.

In some cases a host ($101_{1-n}$) connected to control layer 103 can act as an initiator (e.g. SCSI initiator) and be operable to send commands (or requests) to perform interface operations the commands being directed to targets within storage system 102, and receive responses from storage system 102. A host ($101_{1-n}$) can be an external server, a group of servers, a port in server, a laptop or personal computer, or any other entity associated with a processing unit and capable of performing the operations specified above.

Requests to execute operations are typically addressed to various kinds of targets (e.g. SCSI targets), such as storage systems, disks, tape devices, etc. These devices are associated with some type of control device which is operable to act as a receiver of incoming requests, process and validated the requests, enable the execution of the requested tasks and possibly enable to send status report or requested data back to the initiator.

In the following discussion, for simplicity and clarity purposes, certain parts of the presently disclosed subject matter are described in connection to SCSI protocol. However, it should be noted that the principles of the presently discloses subject matter are not limited to SCSI protocols alone and can be easily adapted by anyone versed in the art, to other protocols.

SCSI (Small Computer System Interface) is a technology and standard for data transfer between computer network storage devices. In order to be operable to operate according to SCSI protocol storage system 102 can comprise appropriate hardware and software. The SCSI protocol defines communication between SCSI initiators and SCSI targets, where an initiator is a device that can initiate SCSI commands and receive responses, and a target is an end device, which is configure to receive and handle SCSI commands. An initiator can be configured for example, to send requests, via a Parallel SCSI or Fiber Channel protocol to a control device in control layer 103, which is configured as a SCSI target device.

A storage system can comprise multiple physical ports connecting hosts to target within the system. In a SCSI based system, these ports are SCSI ports, each assigned with a SCSI target address. An external host may be allowed to address a certain volume via a certain port, thus creating an ITL (initiator, target, LUN) comprising the host as initiator T, the port as target 'T', and the logical volume which is assigned a Logical Unit Number (LUN) and it is thus exported to the host. Each SCSI target may provide multiple logical units and thus represent multiple volumes. A given logical volume may be exported to different hosts via the same or different ports, but is represented to each host with a different LUN. Thus, a LUN represents an individually addressable (logical) SCSI entity that is associated with a physical SCSI device (target).

When a LUN is assigned to a host, it acts as a physical disk drive for the host. The host can perform interface operations on it. Storage Administrators can selectively assign access and control privileges to initiators (e.g. associated with hosts) depending on the LUN.

It should be noted that as used herein, the terms "initiator" and "target" are used as a general terms and refer to any entity having functionalities similar to those of a client and server, respectively. Initiators and targets include, but are not limited to, SCSI initiators and SCSI targets.

In accordance with the presently disclosed subject matter, control layer 103 can comprises a cache memory 105, cache management module 106 an IO management module 108 and target security module 107. Security Manager 120 is operatively coupled to host computers $101_{1-n}$ and to control layer 103 and configured to communicate with associated initiators and targets as further detailed below. Security manager 120 can be directly connected to hosts $101_{1-n}$ or connected via network 150. In some cases a secured communication channel can be used for communicating between initiators and security manager 120. Security manager 120 is coupled to a computer processor to enable its processing operations. As illustrated in FIG. 1, security manager 120 can be configured as a separate processing unit which is not integrated within storage system 102, for example as a plug-in utility that can remotely communicate with storage system 102. Alternatively or additionally, security manager 120 can be integrated within storage system 102, for example as part of control layer 103. When integrated as part of security system 102, security manager 120 can be configured as a single unit or it can be configured as a plurality of functional unit distributed within control layer 103.

As mentioned above hosts can be connected to control layer 103 and send requests to execute interface operations in respect of logical units in the logical storage space. When a command reaches control layer 103 the identity of the entity which initiated the request is not always clear. This problem becomes even more sever when connection between hosts and control layer 103 is established over a network 150.

According to the presently disclosed subject matter, there is provided a system (and corresponding method) associated with a security manager 120 which provides an improved approach which enables to better identify the requesting entity (e.g. initiator) and accordingly decide whether to allow or deny a request, initiated by that entity.

In addition, the presently disclosed subject matter discloses a new approach which enables to selectively permit the access to a logical storage space according to different criteria such as the respective LUN and the type of command.

Requests (to perform commands) are communicated between initiator and targets according to some predefined protocol. For example, SCSI commands can be transported using a fiber channel protocol or Parallel SCSI. Such protocols are adapted to transport the necessary parameters and information to the requested destination, wherein data is held according to some type of a predefined format, which is referred herein as "information unit" (IU). Such information units typically include a field designated for holding a LUN parameter as well as other fields designated for containing other parameters and data.

One example of an information unit is illustrated with reference to FIG. 2. FIG. 2 is a schematic illustration of a fiber channel command information unit Payload (FCP_CMND IU Payload), as known in the art. In FIG. 2 the first field denotes an identifier of a respective LUN (FCP_LUN) to which the command (or request) is addressed. Other fields in the FCP_CMND IU Payload denote addition information such as a reference number identifying the command and a command CDB (command descriptor block).

According to the presently disclosed subject matter, a standard LUN field, in an IU, can be populated with other parameters in addition or instead of the standard LUN. A modified LUN field, as disclosed herein is referred to as "secure-LUN". In the following discussion an information unit comprising a secure-LUN is referred to as "secure-IU". In the non-limiting example illustrated in FIG. 2 FCP_LUN is replaced with a secure-LUN.

Figure 3:
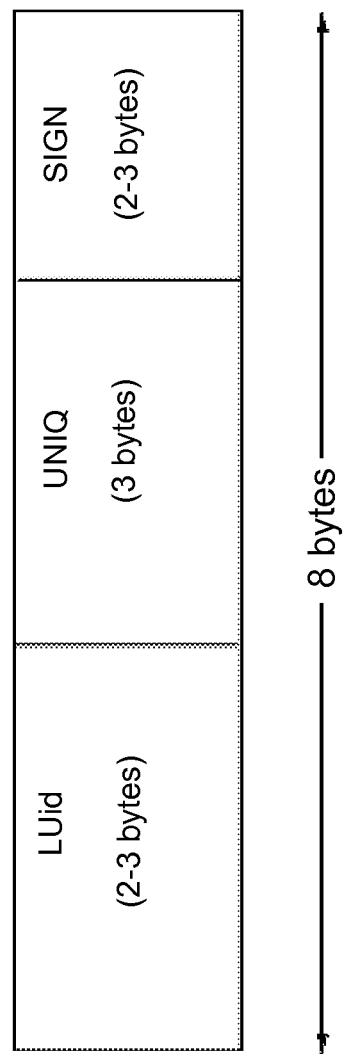
FIG. 3 is a schematic illustration of an example of a secure-LUN field, in accordance with the presently disclosed subject matter.

FIG. 3 is a schematic illustration of an example of a secure-LUN field, in accordance with the presently disclosed subject matter. The secure-LUN field can comprise for example, about 8 bytes divided, as indicated in FIG. 3, into three fields:

LUid (2-3 bytes)—an ID field that uniquely identifies a LU within the storage system, in a manner agreed between, and understandable to all the entities which take part in the data communication as disclose herein including: initiators (e.g. computer hosts $101_{1-n}$), security manager 120 and targets. In some cases LUid is the standard LUN which is normally used to identify an LU. In other cases LUid can be an identifier which is different than the standard LUN.

UNIQ (3 bytes)—is a "uniquifying field" that may be time-based which identified the initiator which generated the secure-IU.

SIGN (2-3 bytes)—is an identifying signature. The signature can be generated for example, by calculating a value with the help of a hash function. As explained in more details below the hash-function can be calculated with a secret key (unknown to the initiator) and possibly other parameters such as, for example LUid.

In some cases commands (e.g. SCSI commands) may be grouped into groups (referred herein as "command-groups" and denoted as $G_1, G_2 \ldots G_n$), for instance, $G_1$ can comprise read-type commands, $G_2$ may comprise write-type commands, $G_3$ may comprise read and write command, $G_4$ may comprise control commands, etc. Accordingly, the initiator's access to a LUN can be classified based on the command group of the requested command. For example, a certain initiator can be permitted to execute read-commands only in respect of a first LUN, and be permitted to execute commands form all command-groups in respect of a second LUN. According to another example, a certain initiator can be permitted to execute commands from only one command group, regardless of the respective LUN.

Figure 4:
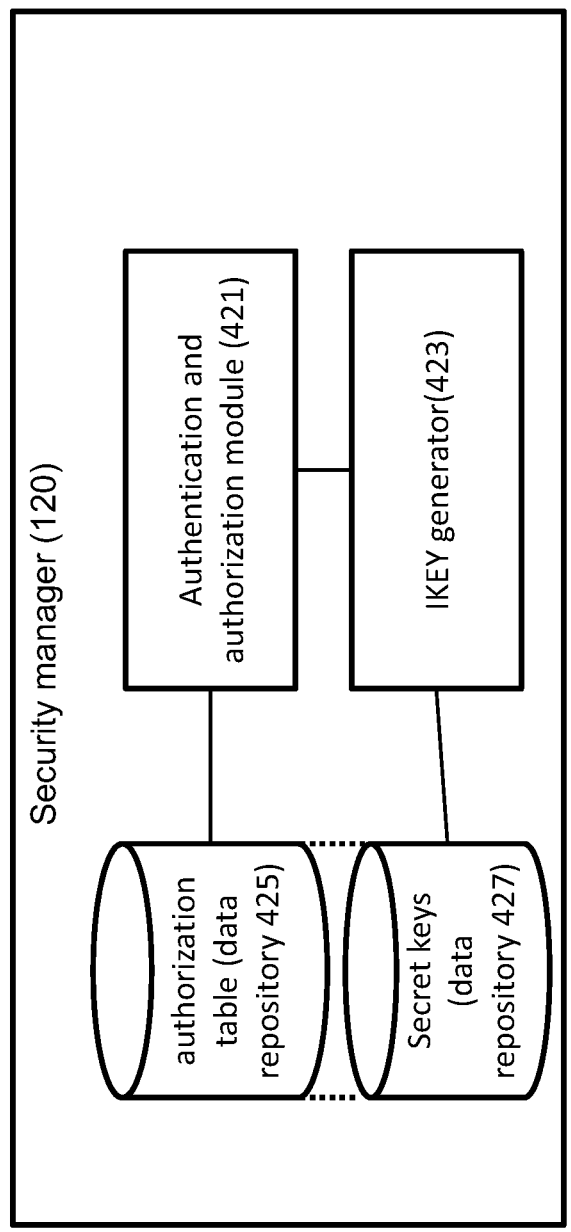
FIG. 4 is a schematic illustration of a security manager 120, in accordance with the presently disclosed subject matter.

FIG. 4 is a schematic illustration of a security manager 120, in accordance with the presently disclosed subject matter. FIG. 5a is a flowchart illustrating the operations performed by security manager 120, in accordance with the presently disclosed subject matter. Security manager 120 comprises an authentication and authorizing module 421, an IKEY generator 423, and is associated with one or more data-repositories configured to store an authorization table (e.g. data-repository 425) and one or more secret keys (e.g. data-repository 427).

Data-repositories 425 and 427 can be directly associated with security manager 120, for example they may be located on the same device, or directly connected to the device. Alternatively or additionally, data-repositories 425 and 427 can be located on a remote device which is accessible to security manager 120, via any type of communication facility or network (e.g. wired or wireless network). Data-repositories 425 and 427 can be configured as a number of distributed data-repository units or as a single consolidated data-repository unit.

As mentioned above security manager 120 can be located remotely from storage system 102 or it can be integrated as part of storage system 102. According to the specific configuration security manager 120 can comprise the required communication infrastructure (not shown), to facilitate communication with different initiators (e.g. computer-hosts $101_{1-n}$) and different targets within storage system 102.

Figure 5:
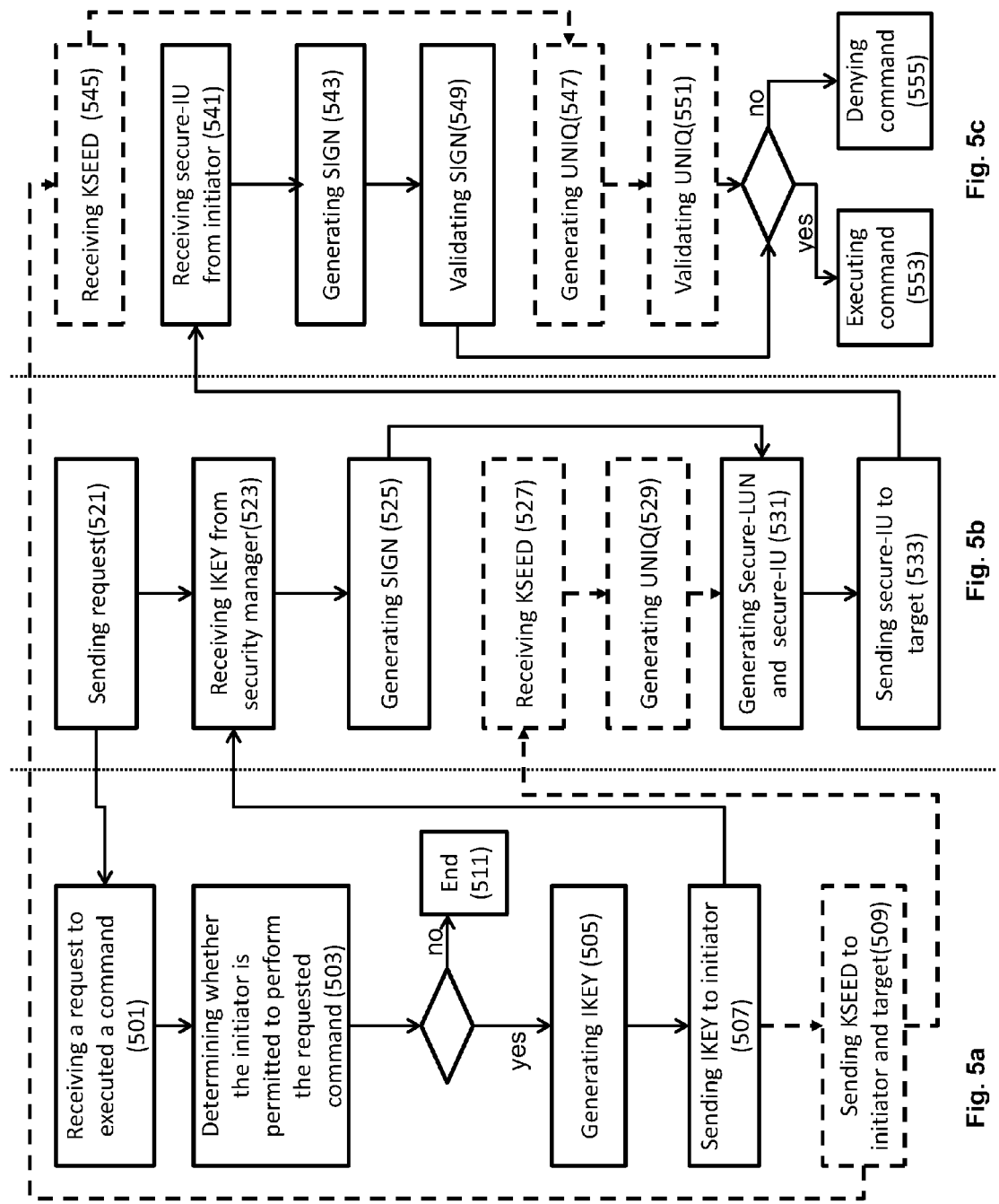
FIG. 5a is a flowchart illustrating the operations performed by security manager 120, in accordance with the presently disclosed subject matter.
FIG. 5b is a flowchart illustrating the operations performed by initiator, in accordance with the presently disclosed subject matter.
FIG. 5c is a flowchart illustrating the operations performed by target device, in accordance with the presently disclosed subject matter.

Block 501 in FIG. 5 refers to receiving a request, by security manager 120, to obtain an approval to execute a command. The request, which is issued by an initiator, comprises the parameters which are required for authorization of the request by the security manager 120. In general an initiator that accesses a volume representing physical storage space identifies the volume of interest with an identifier of the logical unit which is presented to the initiator and represents the logical volume. However, the specific parameters which are communicated with the request can depend on the configuration and requirements of the authorization process which is implemented by security manager 120. For example, in case authorization to execute a command is based only on the identity of the requesting initiator and not on the identity of the respective LUN (e.g. in case of a SCSI report-LUNs command), the request includes information identifying the initiator while data identifying the LUN may not be required, or alternatively a default identifier (such as LUN 0) can be used. On the other hand in case authorization to execute a command is based on the identity of the requesting initiator and the identity of the respective LUN, the request includes information identifying the initiator and an LUid identifying the respective LUN. The request can also include for example information identifying the command-group of the requested command.

In some cases, responsive to a request, security manager 120 is configured to authenticate the identity of the initiator and check whether the requesting initiator is authorized to execute the requested command (Block 503). This can be performed for example with the help of authentication and authorization module 421. Security manager 120 can be associated with an authorization table, which includes details in respect of the commands which are authorized to different initiators. Based on the information in the authorization table security manager 120 can determine whether, the requested command should be permitted or denied.

In case it is determined that initiator is not permitted to perform the requested command the process ends (Block 511). Optionally, a "request denied" message can be sent to the initiator.

In case it is determined that the initiator is authorized to perform the requested command an IKEY value is generated (Block 505). Security manager 120 can be configured, for example, to calculate an IKEY value using a predefined function. IKEY can be, for example, a signature calculated with the help of a predefined hash-function (herein "hash1"), which provides a cryptographically secure value. Parameters used in the hash-function to calculate the IKEY include a secret key KS which is shared by security manager 120 and its corresponding targets (e.g. SCSI target devices in control layer 103) and is unavailable to the initiators (e.g. hosts $101_{1-n}$). For example, in case an initiator is interested to access a certain logical unit identified by a LUid, the relevant secret key is available to at least the target device which is associated with the respective logical unit.

Additional parameters, other than KS, can be used for calculating IKEY. These parameters can include for example, the logical unit identifier (LUid) and the command group identifier $G_i$. According to one non-liming example the hash function can be represented by the following expression:

$$IKEY(G_i)=HASH1(G_i,LUid,KS).$$

Once generated, IKEY is transmitted back to the requesting initiator (Block 507).

As mentioned above, according to the presently disclosed subject matter, a secure-LUN can also include a field designated for a UNIQ parameter which is used in order to further augment the authentication process of the initiator. For example, UNIQ can be used in case the network connecting between the initiator and the target is a non-protected network.

UNIQ can be generated by the initiator by means of a seed KSEED that is sent by security manager 120 to both the initiator and target at the same point in time (Block 509). According to one non-limiting example, the value of KSEED can be the current GMT time in seconds as recorded by security manager 120 at the time of transmitting the seed to the initiator and target. According to another non-limiting example, the KSEED may be randomly generated integer of 8 digits. The value of KSEED may remain valid per individual request to execute a command, or alternatively, it may remain valid in the system for a certain period of time, (e.g. a predefined number of hours or days), after which it is replaced, by security manager 120 which sends a new seed to both initiator and target.

Although, sending of KSEED (Block 509) is illustrated as synchronous operation in respect of the flow of operations in FIG. 5*a*, in some cases KSEED can be sent by security manager 120 asynchronously. For example, KSEED can be sent regardless whether a request has been received by security manager 120, e.g. according to a predefined schedule, the KSEED value being valid for a predetermined period of time.

In should be noted that although in the following discussion some examples are described with a secure-LUN with a uniquifier filed (UNIQ), those versed in the art will readily appreciate that the use of the uniquifier field is optional, and the access control according to the presently disclosed subject matter may be, in a similar manner without the use of a uniquifier field. For example, if the communication is implemented over a secure channel (such as iSCSI over Ipsec or FCP over FCSec) the system can be configured not to use a uniquifiers. Instead, the system may be configured to use a "constant" signature field—e.g. sign only the LUid or a "channel" identifier instead of the uniquifier.

Figure 6:
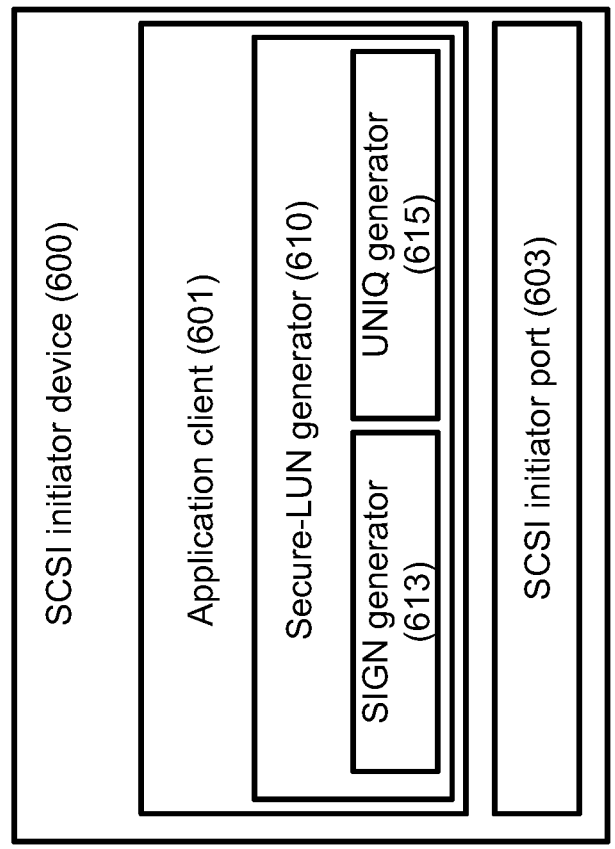
FIG. 6 is a schematic illustration of an initiator 600, in accordance with the presently disclosed subject matter.

Similarly, it should be noted that those versed in the art will readily appreciate that classification of commands in several groups in accordance with permitted capabilities is optional, and access control may be, in a similar manner, provided without such granularity of commands Turning now to FIG. 6 which is a schematic illustration of an initiator device 600, in accordance with the presently disclosed subject matter. Initiator device 600 can be for example, integrated within host computers $101_{1-n}$. Although initiator device 600 is illustrated as a SCSI device it should be noted that this is for the sake of example and should be construed as limiting in any way. Alternatively, initiator device 600 can be configured in accordance with a different protocol which enables similar functionality. Initiator device 600 comprises an application client 601 and an initiator port 603. Initiator port 603 facilitates the communication with the corresponding targets. Application client 601 is configured to send a request to a corresponding target device requesting to execute a task. According to the presently disclosed subject matter, application client 601 can be configured to generate a secure-LUN. To this end application client 601 can comprise a secure-LUN generator 610, which is configured to generate a secure-LUN to be incorporated in a corresponding secure-IU (e.g. secure FCP_CMND IU Payload). The secure-LUN generator 610 can comprise a SIGN generator 613 and optionally also a UNIQ generator 615.

The secure-IU is sent by initiator device 600, to targets which are associated with control layer 103. A more detailed description of the operations which are performed by initiator device (e.g. initiator 600) is provided herein with reference to FIG. 5b.

Turning now to FIG. 5b, an initiator is configured to send a request to security manager 120, requesting permission to send a command to control layer 103, or to a certain target associated with control layer 103 (Block 521). According to one example, the request can be configured as a standard information unit, as illustrated in FIG. 2. In another example, the request can be in any other format, which is specifically adapted for this purpose, provided that it is familiar to security manager 120 and it carries the required information for authorizing the request.

In response, the initiator device 600 receives from security manager 120 an IKEY (Block 523). As explained above, responsive to a request sent by an initiator, security manager 120 is configured, in case the request is authorized, to generate an IKEY and send it back to the requesting initiator. Once the IKEY is received the initiator is configured to generate a secure-LUN. To that end the initiator is configured to generate SIGN value for the (Block 525). The SIGN is another value which can be calculated with a predetermined function, using the IKEY as parameter and possibly additional parameters, which can include for example, the command group identifier $G_i$. SIGN can be calculated with the help of a predefined hash-function (herein "hash2"), which provides a cryptographically secure value. According to one non-limiting example the hash function can be represented by the following expression: $SIGN(G_i)=HASH2(IKEY(G_i))$.

As mentioned above a UNIQ value, can also be used for further enhancing the authentication of the initiator. In case a UNIQ value is utilized, a KSEED, which is received by initiator (Block 527) is used for generation of the UNIQ value (Block 529). According to one example, when an IKEY value is received by the initiator, the initiator checks whether the available KSEED is still valid. If it is has expired it may request from security manager 120 to send a new KSEED. In response, security manager 120 is configured to confirm that the same valid KSEED is available to both the initiator and the respective target. Likewise, target security module 107 may be adapted to check periodically that KSEED it is using is valid. As mentioned above KSEED can be sent to initiators asynchronously in respect of other operation of the process described in FIG. 5b.

Initiator device can be configured to generate the UNIQ value according to predefined principles which are also known to the corresponding target devices. According to one example, UNIQ can be represented as a string of characters. Accordingly, initiator device 600 can be configured, for example, to concatenate to the string KSEED the last four bits of the current value in seconds of its own clock at the time of generating UNIQ, and then concatenate to the resulting sting, the last four bits of the command number of the requested command.

As further explained below, target device can be adapted to repeat and generate a UNIQ value according to the same process used by the initiator, and thereby validate the UNIQ value which was generated by initiator.

Once SIGN and optionally UNIQ are available a secure-LUN is generated (e.g. by secure-LUN generator 610). An example of a secure-LUN is illustrated with reference to FIG. 3. A secure-IU is generated (e.g. by application client 601) comprising the secure-LUN (Block 531). The secure-IU is sent to the corresponding target (Block 533).

The secure-IU is received by IO management unit 108 and then transmitted to target security module 107. IO management unit 108 and/or target security module 107 can be incorporated as part of a target device within control layer 103. Alternatively or additionally, IO management unit 108 and/or target security module 107 can be distributed within control layer 103 and operable to serve a plurality of target devices. IO management unit 108 can be implemented for example, as part of (or in association with) a SCSI target device (port) configured to facilitate communication between the target and corresponding initiators in accordance with SCSI protocol and adapted to handle SCSI commands. To this end the IO Management Module 108 may be adapted to work as a driver that is able to receive and process incoming SCSI commands with a secure-IU.

Figure 7:
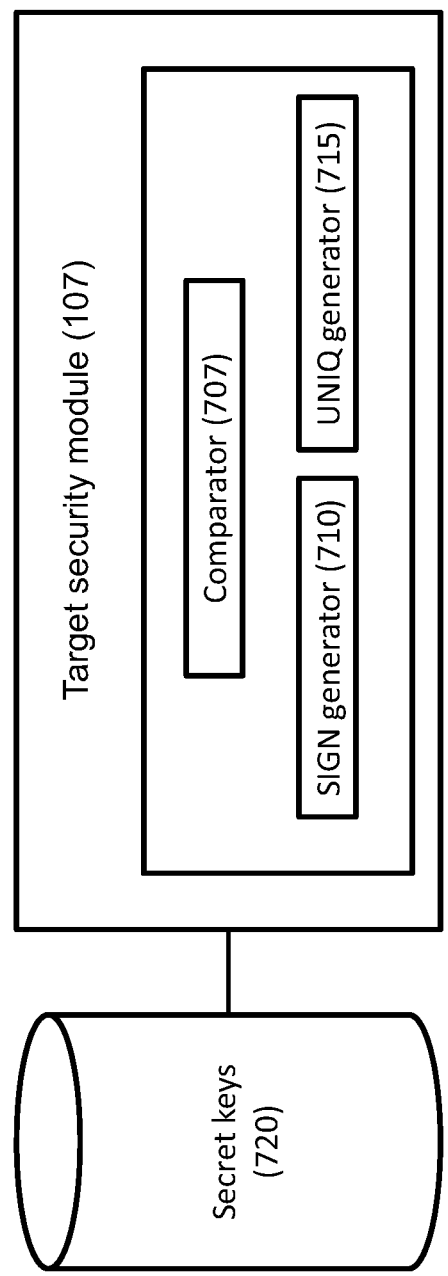
FIG. 7 is a schematic illustration of a target security module 107, in accordance with the presently disclosed subject matter.

FIG. 7 is a schematic illustration of a target security module 107, in accordance with the presently disclosed subject matter. Target security module 107 is configured in general to process incoming initiator's requests. In a system running in accordance with a SCSI based communication protocol target security module 107 can be configured, for example, as part of logical unit of a SCSI target device. According to the presently disclosed subject matter, target security module 107 can comprise for example, a SIGN generator 710 configured for generating a SIGN value and possibly also a UNIQ generator 715 for generating a UNIQ value.

According to the presently disclosed subject matter, responsive to a command received from an initiator, the incoming secure-IU is processed and the parameters are extracted from the secure-LUN in the secure-IU. The LUid and the SIGN values (and if used, also the UNIQ value) are extracted from the secure-LUN. Target security module 107 is configured to generate the SIGN value and the UNIQ value (e.g. with the help of SIGN generator 710 and UNIQ generator 715, respectively) and compare the generated values with the values extracted from the secure-LUN (e.g. with the help of comparator 547). In case the generated and received values are the same, target security module 107 allows the execution of the requested task. Otherwise the request is denied. A more detailed description of the operations which are performed by a target is provided herein with reference to FIG. 5c.

Turning now to FIG. 5c, target device receives a request from an initiator, requesting to execute a task (Block 541). As explained above a request, received from an initiator can be in the form of a Secure-IU, comprising a Secure-LUN. As mentioned above, responsive to a request, SIGN value and possibly also the UNIQ are extracted from the incoming secure-IU.

Target device is further configured to recalculate SIGN (Block 543). The secret key KS which was used by security manager 120 to calculate the IKEY is available to target device (e.g. stored in a data repository 720 associated with target security module 107). Secret keys can be provided to targets from security manager 120 (via a push command). Alternatively or additionally, secret keys can be requested by the respective target from security manager 120 (via a pull command). In some cases, such as where security manager 120 is integrated as part of control layer 130, target devices can be granted with access to data repository 127 and retrieve the relevant secret key directly from there.

LUid and $G_i$ are parameters which can be extracted from the incoming secure-LUN. As shown earlier LUid can be represented as a field in a secure-LUN. The command-group $G_i$ can be deduced from the type of command as indicated by the operation code field. Thus, as all the parameters which were used by security manager 120 (as well as the hash-function, hash1) to generate IKEY, are available to target device, target security module 107 can repeat the process of generating IKEY. Once the IKEY value is generated target security module 107 is configured to calculate SIGN using the same function which was used by initiator (hash2), which is also available to target security module 107 (Block 543).

In case a UNIQ value is also used, this value is generated by target security module 107 as well (Block 547). As mentioned above the KSEED which was used by the initiator to generate the UNIQ value is sent to both the initiator and the target. Accordingly, KSEED is received by the target (Block 545) and can be facilitated for generating UNIQ according to the same principles that were used by the initiator. According to the current example, target device may repeat the same calculation which was performed by initiator and concatenate to the KSEED string the value of the last four bits of the value in seconds of its own clock at the time of receiving the command, and then the last four bits of the command received.

In the following operations SIGN and UNIQ are validated (Block 549 and 551). The SIGN and UNIQ values which were extracted from Secure-LUN are compared with the corresponding SIGN and UNIQ values generated by the target device (e.g. by target security module 107). In case the extracted and generated values are the same, target security module 107 authorizes the execution of the requested task (Block 553). Otherwise the request is denied (Block 555).

In some examples, when validating UNIQ, target security module 107 may consider additional criteria that allow compensating for local clock skew between the initiator and the target. Thus, for instance, when comparing the value of UNIQ sent by initiator and the value generated by the target, some pre-determined margin of error may be allowed. Alternatively, target device can be configured to generated more than one value with which UNIQ may be compared. Thus for instance, target device may generate one value as already indicated, a second value by concatenating to KSEED the last four bits of its current time+1 second, and a third value by concatenating to KSEED the last four bits of its current time−1 second. It should be noted that the methods of generating and validating a UNIQ value are merely non-limiting examples, and those skilled in the art would appreciate alternatives, and therefore the proposed examples should not be construed as limiting.

Optionally, after a certain initiator has been authorized to execute a command for the first time, it can store the SIGN value in memory and reuse it for repeating the same command (e.g. reading or writing to the same logical unit). This obviates the need to repeat the process of generating the SIGN value for every new request that is submitted with the same parameters. Similarly target device can also store UNIQ values and use the stored value for authorizing repeating requests from the same initiator.

The presently disclosed approach provides a number of advantages over other approaches which are previously known in the art. For example, one advantage is an enhanced initiator validation. In order to generate the SIGN value the initiator must have knowledge of the hash-function which is used for that purpose. Thus, an initiator which fraudulently received from security manager 120 the IKEY cannot make use of it to access a target if it does not possess the necessary knowledge in respect of the hash function required for calculating SIGN.

Furthermore, by distributing different keys to different targets it is possible to restrict the access of initiators to specific targets. To this end security manager 120 can allocate a unique key KS to each target or group of targets, and thus restrict the access given to an initiator only to targets which are associated with the same key that was used by security manager 120 to generate a specific IKEY which was sent to the initiator.

Alternatively or additionally, each target can be associated with a different hash function which is used to calculate the IKEY. Thus, similar to the pervious example, security manager 120 can restrict the access of an initiator to only those targets which are associated with the same hash-function that was used by security manager 120 to generate a specific IKEY which was sent to the initiator.

According to one example, each target or group of targets can be associated with a constant key and a constant hash-function. Alternatively, security manager 120 can be configured to continuously generate new secret keys for the different targets. This can be done for example with accordance to a predefined schedule, e.g. a new key is generated every predefined number of hours or once a day. According to another example, security manager 120 can be configured to allocate a different secret key (or hash-function) to the different targets such that keys are alternated between the targets in accordance with a predefined schedule. To this end data repository 127 can comprise a table indicating each target and its corresponding key. This table can be updated when a new key is generated for a target or when a different key is allocated to a target. Security manager 120 can be configured in some cases, to notify each target when the secret key or hash-function is modified Among further advantages of the presently disclosed subject matter is the ability to selectively authorize initiators to access specific logical units and to selectively authorize initiators to execute specific interface commands, of specific command-groups, in respect of the accessed logical units. This is accomplished as explained above by incorporating, LUid and/or $G_i$ parameters in the generating of the signatures.

An additional advantage of the presently disclosed subject matter is the transparency of the process in respect of any device(s) on a route between the initiator and the target. As the request is sent from the initiator to the target in a format which is familiar to intermediate agents (e.g. information unit), the intermediate agents are not requested to be modified and can continue and handle the requests as before.

Furthermore, the authorization table can be configured as a user-defined entity that contains all necessary information concerning permissions and capabilities in respect of initiators and targets associated with storage system 102. It was said above that an initiator might be an external host, or a port in a host, but more generally the authorization table can refer to initiators, as abstract entities (for example a user or an application), rather than to ports or to any other specific physical component. One can thus think of more general meaning of an initiator to which permission is granted, such as for instance a user or an application.

This can be relevant, for example, where a single host can be used by different users and each user is uniquely identified and is provided with a different scope of authorizations (e.g. user's authorities vs. system administrator's authorities).

This provides an additional advantage over known methods of LUN masking in respect of the available flexibility and security provided during handling requests sent to targets. Once security manager 120 identifies and authenticates the initiator that is requesting for permission, it may either allow or deny the request, independently of the physical setting from which the initiator is operating. In particular, a change in physical configuration on the hosts or on the switches, etc., does not require modifying the permission scheme on authorization table that may be defined in terms of users or applications, or a combination thereof.

Initiator device can be further configured to validate a status or even data received from the target with the help of an additional signature (e.g. IKEY1) where the target takes on the functionality of the initiator and vice versa throughout the validation process. For example, once the target has executed the requested command it typically sends back to the requesting initiator a status message indicating that the command has been completed, or data which is requested by the initiator. At this time an IKEY1 can be generated by security manager 120 and sent to the target. IKEY1 is generated with the help of special secret key and possibly other parameters and used in the target device to calculate a signature similar to what was demonstrated above with reference to FIG. 5*a* in respect of the initiator. This signature is sent from target to the initiator. This time the secret key is available to the initiator, and the calculation of the signature is repeated in initiator device. The initiator then compares the signature received from the target with the locally generated signature and can thereby authenticate the response, which is allegedly received from the target.

The presently disclosed subject matter is further directed to allow the delegation of commands. Delegation enables one initiator, which has been authorized to submit a command to forward a request to one or more other imitators, which in response can send a corresponding command to a relevant target device and thus take part in completing the requested task. Delegation of command can be advantageous for example, where multiple hosts use the same data. One example for this is a collection of Internet servers working as mirror sites. In other cases a single host can be configured to handle security matters with the security manager and then delegate request to other hosts.

For example, a first initiator (i.e. delegating initiator) which has been authorized by security manager 120 to access a certain target and execute a certain command in respect of a certain logical unit can be adapted to communicate SIGN and possibly also SEED (or UNIQ) to a second initiator (i.e. delegated initiator). The delegated initiator can now create its own secure-LUN field that will be duly confirmed and serviced by the target.

According to a simplified approach of the delegation mechanism, a target will service any request addressed to a specific logical unit that is confirmed by the secure-LUN mechanism in its straightforward implementation. Thus, a target device that would authorize a request of the delegating initiator would also authorize a request of a delegated initiator which uses the same secure-LUN. According to this example, communication between the delegating and delegated initiator can be made through a secure communication channel and the delegated initiator can use the same SIGN parameters (and possibly also the same UNIQ parameters) which were used by the delegating initiator, and receive the same service from the target.

Figure 8:
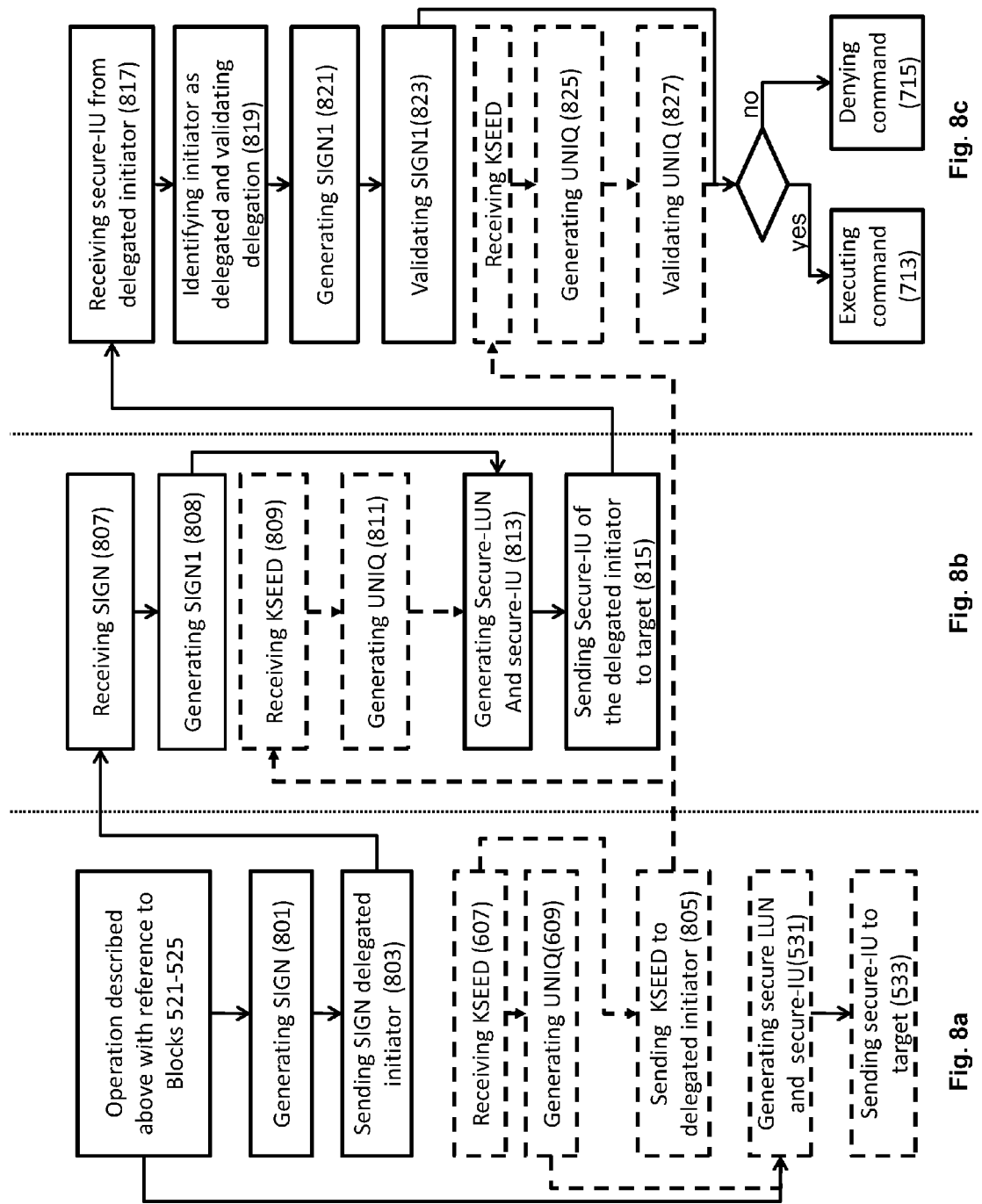
FIG. 8a is a flowchart illustrating the operations performed by a delegating initiator, in accordance with the presently disclosed subject matter.
FIG. 8b is a flowchart illustrating the operations performed by a delegated initiator, in accordance with the presently disclosed subject matter.
FIG. 8c is a flowchart illustrating the operations performed by target device, responsive to a request of a delegated initiator, in accordance with the presently disclosed subject matter.

According to another approach, enhanced security measures are implemented in order to validate the identity of the delegated imitators and more tightly control the authorization process. FIG. 8*a* is a flowchart illustrating the operations performed by a delegating initiator, in accordance with the presently disclosed subject matter. In principle similar operations to those which were described above with reference to FIGS. 5*a* and 5*b* are also repeated in the context of delegations of command with reference to FIG. 8*a*. The operations related to blocks 521-525, which were described above with reference to FIG. 5*b*.

Once IKEY is received by the delegating initiator from security manager 120 and the initiator generates SIGN (Block 801), delegating initiator (e.g. with the help of initiator device 600) can be configured to send SIGN to a delegated initiator (Block 803). In some cases, the initiator can be further configured to send KSEED, previously received from security manager 120, to the delegated initiator (Block 805). This way the delegating initiator operates similar to the security manager 120 in respect of the delegated initiator wherein, the SIGN which is sent to the delegated initiator is equivalent to the IKEY which is sent from security manager to the delegating initiator.

Turning now to FIG. 8*b* schematically illustrating the operations performed by a delegated initiator, in accordance with the presently disclosed subject matter. The delegated initiator receives SIGN (Block 807) and possibly KSEED (block 809) from the delegating initiator.

The delegated initiator is configured to generate a nested SIGN value, SIGN1 (Block 808). According to one non-limiting example, the relevant hash-function can be represented, by the following expression:

$$SIGN1(Gi)=HASH3(SIGN(Gi),LUid).$$

Figure 9:
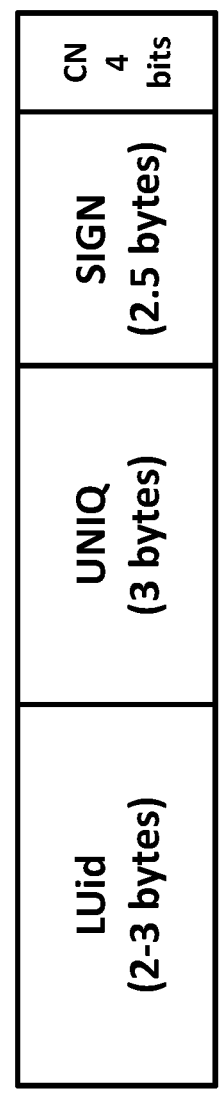
FIG. 9 is a schematic illustration of an example of a secure-LUN field, in accordance with the presently disclosed subject matter.

Delegating initiator can be further configured to generate a UNIQ value based on the received KSEED in a similar way to that described above with reference to block 529 above (Block 811). Delegating initiator is configured to generate a secure-IU (Block 813). The secure-LUN in the secure-IU can include for example, the SIGN1 value, the UNIQ value and the LUid. The secure-LUN of a delegated initiator can further comprise an additional field (CN) indentifying the secure-IU as a being sent by a delegated initiator. FIG. 9 is a schematic illustration of an example of a secure-LUN field of a delegated initiator, in accordance with the presently disclosed subject matter. According to one example CN can be four bits long and used to store an integer indicating the serial number of the delegated initiator. The secure-IU is then sent to the relevant target (Block 815). In the current example, CN is set to equal 1 to indicate that this is the first delegation of the command.

Turning now to FIG. 8*c* schematically illustrating the operations performed by a target, responsive to a request of a delegated initiator, in accordance with the presently disclosed subject matter. The secure-IU is received by the target and processed by target security module 107 (Block 817). Target security module 107 is configured to extract from the incoming secure-IU the CN value, SIGN1 value and possibly also the UNIQ value. The CN value indicates that the secure-IU has been generated by a delegated initiator. Target security module 107 can be configured to check whether delegation is allowed (validate delegation Block 819). Relevant information for validating the delegation can be available, for example, in a data repository associated with target security module 107, and can include information specifying the authorization policy of delegation. For example, permission to delegate command can depend on different parameters such as the group ($G_i$) of the requested command, the delegating initiator, the respective LUN, or where a limited number of delegations are allowed, the number of allowed delegation.

In case the delegation of the requested command is validated, target security module 107 is configured to repeat the generation process of SIGN1 (Block 821). The secret key which was used by security manager 120 to generate the IKEY is available to target (e.g. stored in a data repository 720 associated with target security module 107). LUid and $G_i$ are parameters which can be extracted from the incoming secure-IU. Thus, as all the parameters which were used by security manager 120 (as well as the hash-function) to calculate the IKEY value, are available to the target. Accordingly, target security module 107 can recalculate the IKEY value. Once the IKEY value is generated, target security module 107 is configured to calculate SIGN using the same hash-function which was used by the delegating initiator, which is exemplified herein by the expression SIGN(Gi)=HASH2(IKEY(Gi)). Target security module 107 is further configured to calculate SIGN1 by using the same hash-function (e.g. SIGN1(Gi)=HASH3(IKEY(Gi), LUid)) which was used by the delgated initiator to calculated SIGN1.

Once SIGN1 is recalculated by target security module 107, it can be validated. For example it can be compared with the received SIGN1 and if a match is found the value is validated (Block 823). The UNIQ value is also generated as explained with reference to FIG. 5c (Block 825) and validated by comparing it to the received UNIQ value (Block 827). If the UNIQ value and the SIGN1 value are validated the command is executed by target (Block 713). Otherwise the request to perform the command is denied (Block 715).

In case a delegating initiator delegates a request to a plurality (p) of delegated initiators, rather than to only one as exemplified above, SIGN for each additional delegated initiator can be calculated, for example, with a hash-function by further nesting the previous SIGN (e.g. SIGN1) in the function. A SIGN of an additional delegated initiator can be calculated for example with the expression SIGN2(Gi)=HASH4(SIGN1(Gi),LUid).

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

Those skilled in the art will readily appreciate that various modifications and changes can be applied to the embodiments of the invention as hereinbefore described without departing from its scope, defined in and by the claims associated with the presently disclosed subject matter.

The invention claimed is:

1. A method of controlling access to a logical unit (LU) available to a given initiator in a logical storage space that comprises multiple logical units, the method comprising:
    responsive to an access-related request related to said given initiator and to a target being associated with said logical unit, generating a first value with the help of a secret key, wherein said secret key is available to said target and wherein said first value is generated externally to said target and said given initiator;
    sending said first value to a first host associated with said given initiator;
    in response to the sending of said first value, receiving by said target, from a second host associated with a second initiator: (i) a second value, generated based on said first value, and (ii) a third value indicating that the second value has been sent by the second host that is different from the first host;
    validating by said target the received second value with the help of said secret key and said third value; and
    allowing the respective access in case said second value is validated.

2. The method according to claim 1 further comprising: validating said access-related request, wherein the validation is provided externally to said target and said given initiator.

3. The method according to claim 1 wherein said validating further comprises:
    generating, by said target, said first value with the help of said secret key and generating a forth value based on said first value and said third value;
    comparing the received second value with the forth value; and allowing the respective access in case said second value and said forth value are the same.

4. The method according to claim 1 wherein said logical storage space is a logical representation of physical storage space which is accessible by a control layer, the control layer is associated with a security manager and wherein at least said generating a first value is performed by said security manager.

5. The method according to claim 3, wherein said first value is calculated with the help of a first function and said second value is calculated with the help of a second function, and wherein said first function and second function are available to said target and are utilized by it to calculate said first and said forth values, respectively.

6. The method according to claim 1, wherein said first value is generated with the help of an identifier of said logical unit, thereby enabling to selectively permit access to said logical unit among the multiple logical units.

7. The method according to claim 1, wherein commands are classified according to command-groups, each command-group identified by a specific command-group identifier ($G_i$), and wherein said first value is generated with the help of a command-group identifier ($G_i$) corresponding to said command, thereby enabling to selectively permit to execute a command identified by said command-group identifier ($G_i$).

8. The method of claim 7 wherein the command-groups comprise one or more of the following:
    a command-group comprising read-only commands;
    a command-group comprising write-only commands;
    a command-group comprising read-write commands; and
    a command-group comprising control commands.

9. The method according to claim 4, further comprising:
    receiving, by said target a SEED; said SEED is sent from said security manager to said target and said first host substantially at the same time;
    receiving, by said target, from said first host, a first identifier associated with said given initiator wherein said identifier is generated with the help of said SEED and according to predefined principles;
generating, by said target, a second identifier with the help of said SEED, in accordance with said principles;
comparing said first identifier and said second identifier;
allowing respective access in case said first identifier and said second identifier are substantially the same.

10. The method according to claim 1, wherein communication between said target, and said given and second initiators is in accordance with SCSI protocol.

11. The method according to claim 1 further comprising:
receiving, by said target, a secure-LUN field comprising said second value.

12. The method according to claim 11 wherein said secure-LUN further comprises an identifier of said given initiator generated with the help of a SEED in accordance with predefined principles.

13. The method according to claim 1, wherein said logical storage space is a logical representation of physical storage space which is accessible by a control layer, the control layer is associated with a plurality of targets, each target being associated with at least one logical unit, and wherein each of said plurality of targets is associated with a different secret key;
said first value is generated with the help of a secret key which is associated with said target, thereby enabling to selectively permit access to said at least one logical unit associated with said target.

14. The method according to claim 1, further comprising:
receiving, by said target, a delegated request from a delegated initiator, said delegated request comprising a delegated value generated by said initiator based on said second value and transmitted to said delegated initiator;
validating said delegated value with the help of said secret key and a value corresponding to said second value; and
allowing said delegated request in case said delegated value is validated.

15. A method of operating a security manager configured to control access to a logical unit (LU) available to a given initiator, in a logical storage space that comprises multiple logical units, representing a corresponding physical storage space, said logical storage space being accessible via a storage control layer, said storage control layer being associated with a security manager, the method comprising:
receiving, by said security manager, an access-related request related to said given initiator and to a target being associated with said logical unit;
generating, by said security manager, a first value with the help of a secret key; said secret key being available to said target;
sending said first value to a first host associated with said given initiator;
receiving from a second host, associated with a second initiator: (i) a second value generated based on said first value, and (ii) a third value indicating that the second value has been sent by the second host that is different from the first host;
enabling said target to validate the received second value with the help of said secret key and said third value; and
allowing the respective access in case said second value is validated.

16. A storage system comprising a storage control layer, a physical storage space represented by logical storage space comprising multiple logical units and accessible via the storage control layer, and a security manager operatively associated with said control layer and configured to control access to a logical unit associated with a respective target associated with said logical storage space,
the security manager is further configured to receive an access-related request related to a given initiator and to the target associated with said logical unit, to generate a first value with the help of a secret key, said secret key being available to said target and to send said first value to a first host associated with said given initiator;
said security manager is configured, to receive from a second host associated with a second initiator: (i) a second value generated based on said first value, and (ii) a third value indicating that the second value has been sent by the second host that is different from the first host;
the security manager is further configured to validate the received second value with the help of said secret key and said third value; and to allow the respective access in case said second value is validated.

17. The system according to claim 16 wherein said security manager is further configured to validate said access-related request, wherein the validation is provided externally to said target and said given initiator.

18. The system according to claim 16 wherein in order to validated said second value said target is configured to generate said first value with the help of said secret key and generate a forth value based on said first value and said third value;
compare the received second value with the forth value; and allow the respective access in case said second value and said forth value are the same.

19. The system according to claim 18, wherein said first value is calculated with the help of a first function and said second value is calculated with the help of a second function, and wherein said first function and second function are available to said target, said target is configured to utilize said first function and said second function to calculate said first and said third forth values, respectively.

20. The system according to claim 16, wherein said first value is generated with the help of an identifier of said logical unit, thereby enabling to selectively permit access to said logical unit among the multiple logical units.

21. The system according to claim 16, wherein commands are classified according to command-groups, each command-group identified by a specific command-group identifier ($G_i$), and wherein said first value is generated with the help of a command-group identifier ($G_i$) corresponding to said command, thereby enabling to selectively permit to execute a command identified by said command-group identifier ($G_i$).

22. The system according to claim 21 wherein the command-groups comprise one or more of the following:
a command-group comprising read-only commands;
a command-group comprising write-only commands;
a command-group comprising read-write commands; and
a command-group comprising control commands.

23. The system according to claim 16 wherein said target is further configured to:
receive a SEED; said SEED is sent from said security manager to said target and said given initiator substantially at the same time;
receive from said first host, a first identifier associated with said given initiator wherein said identifier is generated with the help of said SEED and according to predefined principles;
generate a second identifier with the help of said SEED, in accordance with said principles;
compare said first identifier and said second identifier;
allow the respective access in case said first identifier and said second identifier are substantially the same.

24. The system according to claim 16, wherein communication between said control layer and said first and second hosts is in accordance with SCSI protocol and wherein said target is a SCSI target device.

25. The system according to claim 24, wherein said target is further configured to receive a secure-LUN field, said secure-LUN field comprising said second value.

26. The system according to claim 25 wherein said secure-LUN further comprises an identifier related to said initiator generated with the help of a SEED in accordance with pre-defined principles.

27. The system according to claim 16, wherein said control layer is associated with a plurality of targets, each target being associated with at least one logical unit, and wherein each of said plurality of targets is associated with a different secret key;
 said security manager is configured to generate said first value with the help of a secret key which is associated with said target, thereby enabling to selectively permit access to said at least one logical unit associated with said target.

28. The system according to claim 16, wherein said target is further configured to receive a delegated request from a delegated initiator, said delegated request comprising a delegated value generated by said initiator based on said second value and transmitted to said delegated initiator;
 validate said delegated value with the help of said secret key and a value corresponding to said second value; and
 allow said delegated request in case said delegated value is validated.

29. The system according to claim 16 wherein said security manager is integrated within said control layer.

30. A security manager operatively connectable to a storage system comprising a storage control layer, a physical storage space represented by logical storage space that comprises multiple logical units and accessible by the storage control layer, the security manager is configured to control access to a logical unit associated with a respective target associated with said logical storage space,
the security manager is further configured to receive an access-related request related to a given initiator and to the target associated with said logical unit, to generate a first value with the help of a secret key, said secret key being available to said target and to send said first value to a first host associated with said given initiator;
the security manager is further configured to receive from a second host associated with a second initiator: (i) a second value generated based on said first value, and a third value indicating that the second value has been sent by the second host that is different from the first host; the security manager is further configured to validate the received second value with the help of said secret key and said third value; and to allow the respective access in case said second value is validated.

31. A program storage device readable by machine, tangibly embodying a program of instructions executable by the machine to perform method steps of controlling access to a logical unit (LU) available to a given initiator in a logical storage space, the method comprising:
 responsive to an access-related request related to said given initiator and to a target being associated with said logical unit, generating a first value with the help of a secret key, wherein said secret key is available to said target and wherein said first value is generated externally to said target and said given initiator;
 sending said first value to a first host associated with said given initiator;
 in response to the sending of said first value, receiving by said target, from a second host associated with a second initiator: (i) a second value, generated based on said first value and (ii) a third value indicating that the second value has been sent by the second host that is different from the first host;
 validating by said target the received second value with the help of said secret key and said third value; and
 allowing the respective access in case said second value is validated.

\* \* \* \* \*